Nov. 20, 1928.  S. L. C. COLEMAN  1,691,959
VEHICLE SUSPENSION
Filed June 23, 1922   3 Sheets-Sheet 1

Nov. 20, 1928.       S. L. C. COLEMAN       1,691,959
VEHICLE SUSPENSION
Filed June 23, 1922       3 Sheets-Sheet 2

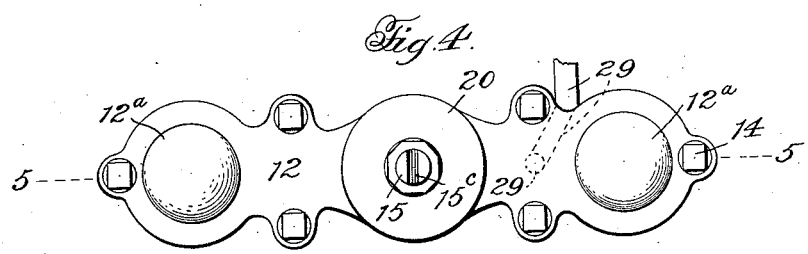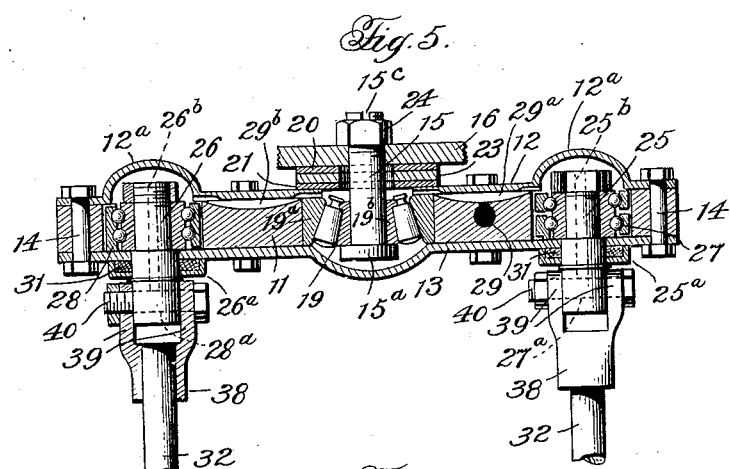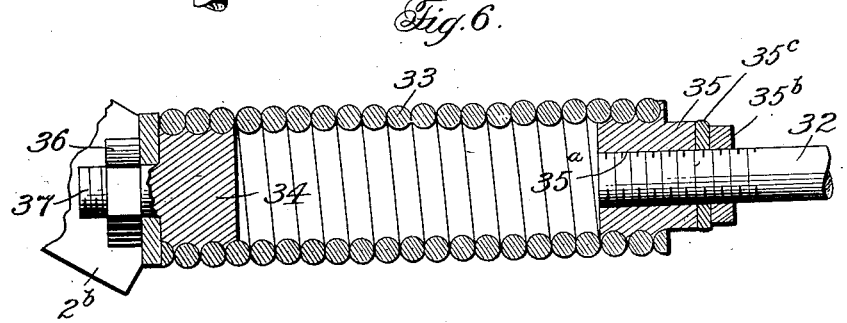

Patented Nov. 20, 1928.

1,691,959

UNITED STATES PATENT OFFICE.

STEPHEN LEONARD CHAUNCEY COLEMAN, OF FREDERICTON, NEW BRUNSWICK, CANADA.

VEHICLE SUSPENSION.

Application filed June 23, 1922. Serial No. 570,457.

This invention relates to improvements in vehicle suspensions and more especially to improved stabilizer mechanism therefor.

The object of the invention is to provide improved stabilizer mechanism of a simple efficient nature that will prevent side sway or rolling of the vehicle body without interference with the necessary vertical movement of the body and axle relatively to each other, and which also will permit of tilting of the axle relatively to the body when one wheel only encounters a rise or fall in the road surface.

The invention contemplates stabilizer means including an equalizer device connected with the vehicle frame or body, and strut connections between the equalizer device and the running gear. A particularly important novel characteristic of the invention resides in the special construction of the strut connections provided including a rigid rod part and a resilient or elastic portion whereby the efficiency of the mechanism is increased to a considerable extent, the desired flexibility is afforded to accommodate for the necessary vertical play between the vehicle body and the axle, and for tilting of the axle, the mechanism operating more perfectly and smoothly throughout the different vertical positions assumed by the body, and wearing of the parts, liability of rattling, and the need of lubrication is largely eliminated.

The invention, with other objects and advantages thereof, and the particular construction, combination and arrangements of parts comprising the same, will be understood from the hereinafter contained detailed description, when considered in connection with the accompanying drawings, forming part hereof, and illustrating one embodiment of the invention.

In the drawings:

Fig. 4 is a detail top plan view of the equalizer lever.

Fig. 5 is a section on the line 5—5 of Figure 4, and

Fig. 6 is a detail longitudinal section of the lower resilient portion of one of the strut connections.

Figure 1:
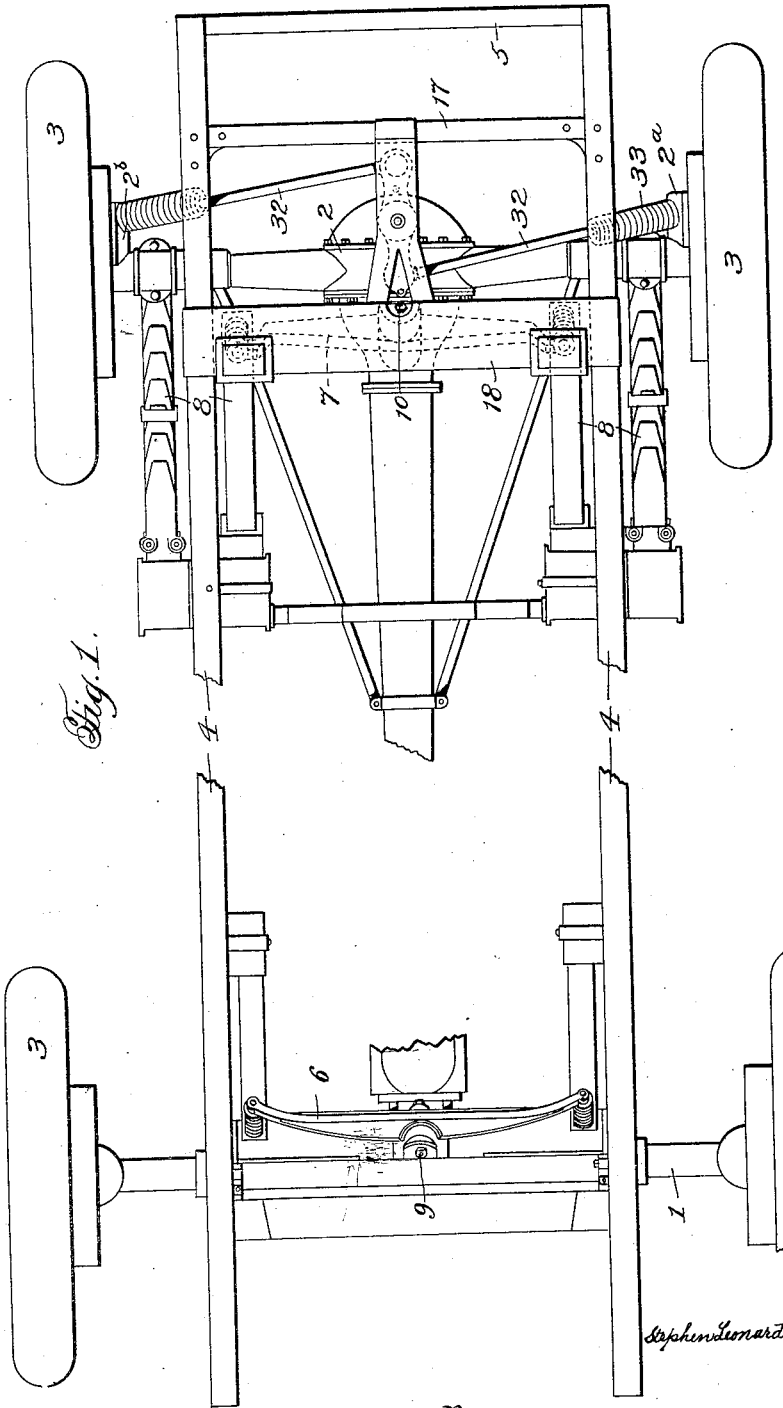
Figure 1 is a top plan view of a portion of a vehicle equipped with the stabilizer mechanism in accordance with the present invention.
Figure 2:
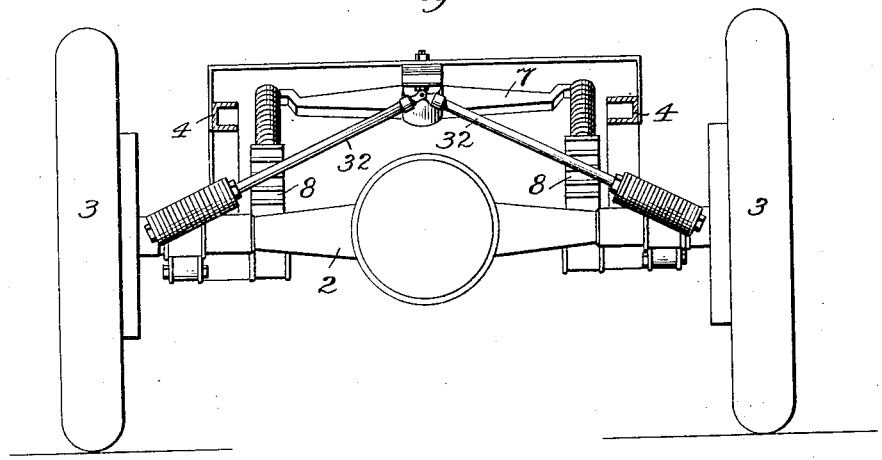
Fig. 2 is a rear end elevation.
Figure 3:
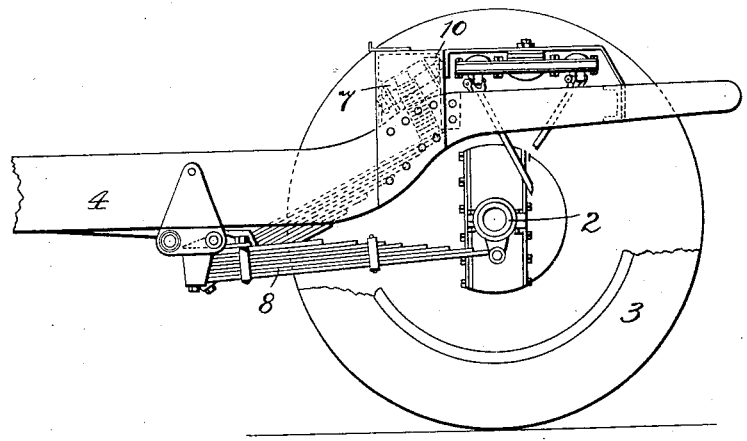
Figure 3 is a side elevation of a rear end portion of a vehicle, and part of the stabilizer mechanism.

While my improved stabilizer mechanism is applicable to various kinds of spring suspensions, it is particularly adapted and possesses especial advantages with a spring suspension of the general type disclosed in my Patent No. 1,289,398 of December 31, 1918, in which the frame is supported through transversely disposed equalizing members pivotally connected intermediate their ends with the frame, and connected at their ends with leaf springs located at opposite sides of the frame and connected with the axles. In the drawings, my improved stabilizer mechanism is shown in combination with a spring suspension of this type. 1 designates the front axle, 2 the rear axle housing, 3 the wheels, 4 the side bars and 5 end bars of the vehicle body supporting frame. 6 and 7 designate the equalizer members pivotally connected with the frame, and 8 are the springs, each consisting of a pair of leaf spring members secured together at their butt ends and pivotally connected to the side bars 4 of the frame, and flexibly connected at their outer ends respectively to the outer portion of one of the equalizing members and one of the axles. In the present construction, the load carrying pivots 9 and 10 are disposed so that their axes extend at an angle to each other, this arrangement while increasing the stability of the frame at the same time increasing the flexibility of the axle action because the equalizing member is so placed that its ends travel at a tangent to an arc passing through its center and struck with the pivot at the butt of the spring as a center, the path of travel of the end of the upper spring member and the end of the equalizing member being approximately the same.

In the particular exemplification of my improved stabilizer mechanism illustrated in the drawings, the equalizer device takes the form of a lever pivotally connected intermediate its ends to the under side of the rear portion of the vehicle frame centrally of the sides thereof to swing in a plane parallel therewith. The lever is shown as consisting of a main central member 11, and top and bottom plates 12, 13, detachably secured thereto by bolts 14 or equivalent means. The equalizer lever is rotatably mounted on a short pivot shaft 15 extending downwardly from a plate 16 suitably secured to the frame, for instance, as shown by transverse members 17, 18. Interposed between the pivot shaft 15 and the equalizer lever is an anti-friction roller bearing 19, one ring member 19ª of said bearing being supported between the plates 12 and 13, and the other ring member 19ᵇ fitting upon the pivot shaft 15 and being held in place by an enlarged head portion 15ª on the lower end of the shaft. An extended bearing is provided between the plate 16 and the equalizer lever. This is shown as composed of two steel washer plates 20, 21, and an intermediate plate 23 of Babbitt metal or the like. The pivot shaft 15 has a threaded portion at its upper end engaging a threaded opening in the plate 16, and said shaft 15 has a slot 15ᶜ in its upper end portion for the engagement of a tool whereby the shaft is adapted to be turned to provide for the adjustment of the roller bearing 19, and the bearing washers 20, 21 and 23 in proper working relation. 24 is a jamb nut on the shaft 15 adapted to engage the upper face of the plate 16 and lock the shaft in adjusted position. Rotatably secured to the outer ends of the equalizer lever are short shafts 25, 26, said shafts being mounted in ball bearings 27, 28 supported in openings in the equalizer lever between the top and bottom plates 12 and 13 thereof, and having integral extensions projecting below the equalizer lever provided with bearings 27ª, 28ª. Lubricant is supplied to the several bearings of the equalizer lever through a duct 29 leading inward from one side of the central member 11 and communicating with a channel 29ª in the upper face of said member, said channel communicating with the bearings 19 and 27. 29ᵇ is a channel in the upper face of the central member connecting the bearing 28 with the bearing 19. The upper plate 12 is formed with raised portions 12ª, as shown, providing spaces at the tops of the bearings 27—28, and the shaft portions 25, 26 are provided with channels leading from said spaces to the pivot bolts 40. The plates 12 and 13 serve to protect the bearings from the entrance of dirt and to retain the lubricant, and on the short shaft portions 25, 26 are cup members 25ª, 26ª, in which are placed washers 31 of felt or the like, said washers fitting snugly against the bottom plate 13 and serving to prevent the escape of lubricant from the lower ends of the bearings 27 and 28, the cup members engaging shouldered portions on said shaft portions.

The strut connections are shown as each comprising a rigid rod portion 32 and a resilient portion 33, the latter preferably being in the form of a closed coiled tension spring, as shown, at the lower end of the rigid rod portion forming the connection between the rod and the running gear, each of said closed coiled springs being fixedly secured at one end to the lower end portion of the strut and to one end portion of the rear axle housing 2. Tightly interfitting within the end portions of the coiled springs 33 are plugs or coupling members 34, 35, the plugs having grooved outer faces to receive the coils of the springs. On the axle housing 2 near the ends thereof are brackets 2ª, 2ᵇ, and one of the plugs 34 of each spring is firmly clamped in position with its outer end face against one of said brackets by a nut 36 on a threaded stem part 37 integral with the plug and extending through an opening in the bracket. The other plug or coupling member 35 of each coiled spring is adjustably connected with the lower end portion of one of the rod sections 32, said plug having a threaded bore 35ª, and the rod section 32 having a threaded lower end portion engaging the threaded bore of the coupling member. 35ᵇ designates a jamb nut to lock the parts in adjusted position and 35ᶜ is a washer interposed between said nut and the end of the coupling member. The rod sections 32, at their upper ends have clevis members, each consisting of a sleeve part 38 fixedly secured on the upper end portion of the rod, and spaced apertured ears 39, the clevis members being respectively connected with the bearings 27ª and 28ª of the shafts 25—26 by pivot bolts 40, universal joint connections being thus provided between the upper ends of the strut rods 32 and the ends of the equalizer lever, the struts through the threaded connections between the upper coupling members and the lower end portions of the rods being adjustable in length.

The equalizer lever is arranged to normally extend substantially parallel with the sides of the vehicle frame. In the operation of the stabilizer mechanism, upon vertical movement of the vehicle frame or body relatively to the running gear, the equalizer lever swings upon the pivot shaft 15 and compensates for the change of distance between the parts, the strut connections not interfering with this movement, the closed coiled springs being inactive except for a slight lateral flexing. Any tendency of the load carrying pivots 9, 10, and the vehicle frame or body to shift laterally is resisted by both of the strut connections, one of the struts will be in compression and the other in tension. The closed coiled spring of the strut connection under compression acts in this case as a substantially rigid part, and the upper end of said strut will serve as a fulcrum for the equalizer lever as a whole. As will be understood under this condition the closed coiled spring portion of the strut in tension will, owing to the relation of the parts exert instant and heavy resistance to lateral shifting or movement of the body. When the axle is tilted relatively to the body as occurs in the case of one wheel encountering a rise or fall in the road surface, the coiled spring of one of the strut connections is stretched, sufficient elasticity being provided to compensate for the difference in distance between opposite ends of the axle and the equalizer device thereby avoiding violent lateral movement of the body or breakage which would otherwise result.

It will be noted that the special construction and arrangement of parts, hereinbefore described, affords a simple compact mechanism adapted to be readily applied to various types of vehicle suspensions and that will be strong and durable in use.

The special strut connections between the equalizer device and running gear while acting to promptly resist sidewise or lateral shifting of the body at the same time afford sufficient flexibility to insure ease and smoothness of operation without interference with the necessary vertical play between the body and running gear, and to accommodate for tilting of the axle under one wheel shocks, the coiled spring portions of the strut connections providing an efficient universal connection for the lower end portions of the struts with the running gear, wearing of the parts, liability of rattle, and the need of lubrication being largely eliminated.

While in the construction shown, only a single stabilizer unit is shown associated with the rear portion of the vehicle frame and running gear, it will be understood that as many of such units may be employed as desired to meet different conditions, and that changes and variations in the particular construction shown, and the carrying out of the invention in other forms as will appeal to those skilled in the art and falling within the scope of the appended claims may be practiced without departing from the spirit of the invention.

What I claim is:

1. In a vehicle, the combination with running gear, and a vehicle frame yieldably supported in relation thereto, of stabilizer mechanism including an equalizer device connected with the vehicle frame, and strut rod connections between the equalizer device and the running gear, each strut rod comprising a rigid rod portion and a resilient portion at one end thereof.

2. In a vehicle, the combination with running gear, and a frame yieldably supported in relation thereto, of stabilizer mechanism including an equalizer device connected with the vehicle frame, and strut rod connections between the equalizer device and the running gear, each strut rod comprising a rigid rod portion and a resilient portion.

3. In a vehicle, the combination with running gear, and a frame yieldably supported in relation thereto, of stabilizer mechanism including an equalizer device connected with the vehicle frame, and strut rod connections between the equalizer device and the running gear, each strut rod comprising a rigid rod portion and a resilient portion consisting of a coiled spring fixedly secured at one end to the rigid rod portion.

4. In a vehicle, the combination with running gear, and a frame yieldably supported in relation thereto, of stabilizer mechanism including an equalizer device connected with the vehicle frame, and strut rod connections between the equalizer device and the running gear, each strut rod comprising a resilient portion consisting of a rigid rod portion and a closed coiled spring fixedly secured at one end to the rigid rod portion.

5. In a vehicle, the combination with running gear, and a frame yieldably supported in relation thereto, of stabilizer mechanism including an equalizer device connected with the vehicle frame, a pair of strut rods each flexibly connected at one end with the equalizer device, and a connection for the opposite end of each strut rod with the running gear, said connection comprising a coiled spring connected to the strut rod at one end portion thereof, and fixedly secured at one end to the running gear.

6. In a vehicle, the combination with running gear, and a frame yieldably supported in relation thereto, of stabilizer mechanism including an equalizer device connected with the vehicle frame, a pair of strut rods each flexibly connected at one end with the equalizer device, and a connection between the opposite end of each strut rod with the running gear, said connection comprising a closed coiled spring fixedly secured at opposite end portions to the running gear and the end portion of the strut rod.

7. In a vehicle, the combination with running gear, and a frame yieldably supported in relation thereto, of stabilizer mechanism including an equalizer device connected with the vehicle frame, a pair of strut rods each flexibly connected at one end with the equalizer device, and a connection for the opposite end of each strut rod with the running gear, said connection comprising a closed coiled spring, a shaft member arranged in tight interfitting relation with one end of the spring and rigidly secured to the running gear.

8. In a vehicle, the combination with running gear and a frame yieldably supported in relation thereto, of stabilizer mechanism including an equalizer device, a pair of strut rods, flexible connections between opposite end portions of the strut rods and the equalizer device and running gear, a pair of said flexible connections each comprising a coiled spring, plug members extending within opposite end portions of the spring in tight interfitting engagement therewith, and means rigidly connecting the plug members with the end portion of one of the strut rods and the running gear.

9. In a vehicle, the combination with running gear and a vehicle frame yieldably supported in relation thereto, of stabilizer mechanism including an equalizer lever, pivotally connected intermediate its ends with the vehicle frame, strut rod connections between the opposite end portions of the equalizer lever and the running gear, each of said strut rods comprising a rigid rod portion and a resilient portion.

10. In a vehicle, the combination with running gear, and a frame yieldably supported in relation thereto, of stabilizer mechanism including an equalizer lever pivotally connected intermediate its ends with the vehicle frame, a pair of strut rods each flexibly connected at one end with one end portion of the equalizer lever and a flexible connection between the other end portion of each strut rod and the running gear at one side thereof, said connection comprising a coiled spring fixedly secured at opposite ends to the end portion of the strut and the running gear.

11. In a vehicle, the combination with running gear, and a frame yieldably supported in relation thereto, of stabilizer mechanism including an equalizer lever pivotally connected intermediate its ends with the vehicle frame at the rear portion thereof, a pair of strut rods each flexibly connected at one end with one portion of the equalizer lever, and a flexible connection between the other end portion of each strut rod and one end portion of the rear axle, said connection comprising a coiled spring rigidly secured at one end to the rear axle at one side thereof and fixedly connected at its other end to the end portion of the strut rod.

12. In a vehicle suspension, the combination with a frame, and axles, a transversely disposed equalizing member pivotally connected intermediate its ends with the frame, and leaf springs at opposite sides of the frame, each spring being connected with the axle and with the equalizer member at one side of its pivotal connection, and stabilizer mechanism including an equalizer device connected to the vehicle frame, strut connections between the equalizer device and the running gear, one of said strut connections comprising a rigid rod portion and a resilient portion.

13. In a vehicle suspension, the combination with a frame and axles, a transversely disposed equalizing member pivotally connected intermediate its ends with the frame, and leaf springs at opposite sides of the frame, each spring being connected with the axle and with the equalizer member at one side of its pivotal connection, and stabilizer mechanism including an equalizer device connected with the vehicle frame, strut connections between the equalizer device and running gear, said strut connections each comprising a rigid rod portion and a resilient portion.

14. In a vehicle suspension, a frame, transversely disposed equalizing bars at opposite end portions of the frame, a longitudinally extending pivot shaft connection between each equalizer bar and the frame, the axis of rotation of said pivotal connections extending at an inclination to each other, and leaf springs at opposite sides of the frame at each end thereof, each leaf spring being connected with the frame, one of the axles and one of the equalizer bars at one side of said pivots.

In testimony whereof I hereunto affix my signature.

STEPHEN LEONARD CHAUNCEY COLEMAN.